Feb. 21, 1961  J. A. CODERCH DE SENTMENAT  2,972,674
DIFFUSER DEVICE FOR LAMPS IN GENERAL
Filed June 19, 1958
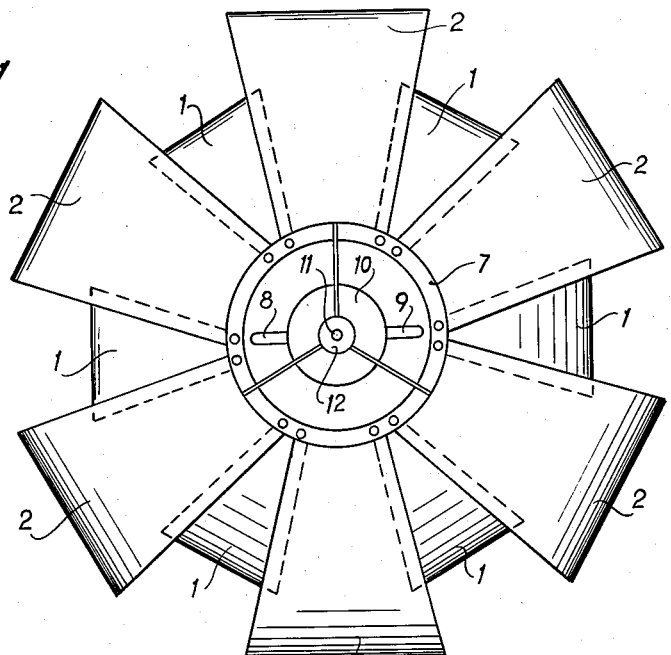
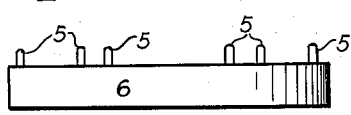
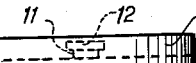
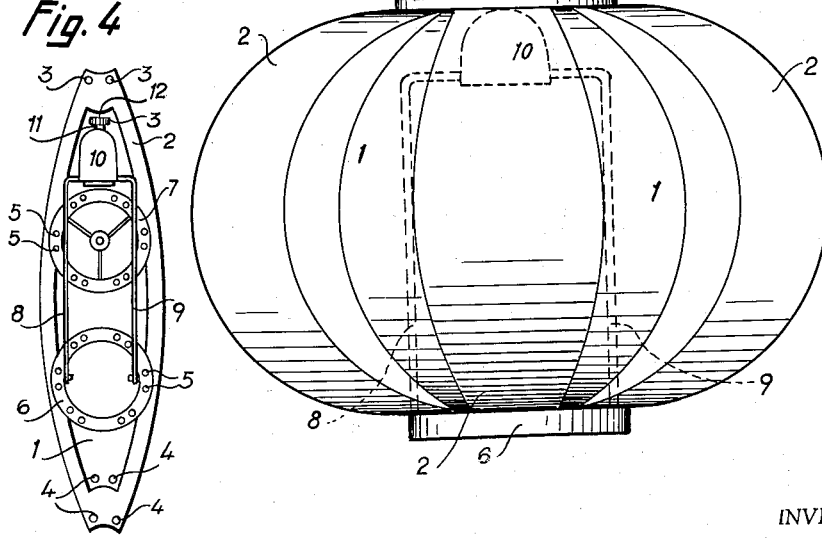
INVENTOR.
JOSE ANTONIO CODERCH DE SENTMENAT

United States Patent Office 2,972,674
Patented Feb. 21, 1961

2,972,674

DIFFUSER DEVICE FOR LAMPS IN GENERAL

Jose Antonio Coderch de Sentmenat, 4 Plaza Calvo, Barcelona, Spain

Filed June 19, 1958, Ser. No. 743,153

3 Claims. (Cl. 240—36)

The present invention relates to a diffuser device for lamps in general.

This device is arranged on the basis of a plurality of laminar elements which may be of any material but are preferably made of thin wood laminations, advantageously translucent, which are connected to a support so that they remain located on different planes at different distances from the light source, and are arranged so that they do not permit the direct issuance of the light beams emitted by the light source of the lamp.

The lamp support consists essentially of two parts provided with suitable pivots for the connection of the diffusor laminated elements which, to this end, have been formed with hole at the ends thereof. These two main parts constituting the support are connected with one another so that the one remains in an upper location and the other in a lower location, and so that this ensemble may be easily disassembled, which, with the laminated elements also removed, permits storing and selling such devices while they occupy a minimum space.

In order to facilitate the description, the present specification is accompanied by a sheet of drawings wherein an embodiment has been shown by way of example not restrictive of the scope of the invention.

In the drawings:

Fig. 1 is a plan view of the device assembled and ready for use;

Fig. 2 shows the same device in elevation view;

Fig. 3 shows the detail of one of the parts constituting the support provided with the corresponding pivots, and Fig. 4 shows the ensemble of the device completely disassembled, in order that it may be stored.

The invention is characterized by its being formed by a plurality of translucent laminated elements, made of a flexible material such as plastic or wooden laminations. These laminated elements have a lanceolate shape, and half the elements, which are numbered with reference numeral 1, have a larger radius of curvature and are smaller in size than the remaining elements, which are numbered with reference numeral 2. For the assembling of the same in the lamp support, they are formed at the ends thereof with respective holes 3 and 4 (two at each end). These elements 1 and 2, by means of the said holes 3 and 4 are clamped on the pegs 5 provided for this purpose on the spaced lower and upper frames 6 and 7 constituting the lamp support. These parts 6 and 7 consist of a circular ring around which the pegs 5 are distributed in groups of two, the clamping of the laminated elements being performed so that those elements of greater size 2 have the holes thereof corresponding to a peg of each group and precisely in a symmetrical arrangement, and the holes in the smaller size 1 correspond to each pair of pegs. Once the assembling is effected as indicated, the laminated elements 2 remain outwardly of the elements 1 as regards the central light source, the first cited elements leaving between each other free zones which are occupied by the latter cited elements, so that no light beam may pass directly to the outside of the device.

These frames 6 and 7 which define the lamp support are connected with one another by lateral rods 8 and 9 hingedly mounted on the lower frame 6, which rods carry the lamp holder 10 fastened thereto at the inwardly bent upper end thereof. At the upper zone of the calotte of the lamp holder 10 there is a small central threaded stud 11 to which the part 7 is fastened by means of the nut 12.

This arrangement in the mounting of the ensemble of elements and parts constituting the diffuser device which is the subject matter of the invention permits a fast disassembling which enhances cleaning, servicing and storing of the same while occupying a minimum bulk, and with the feature of easy reassembling.

I claim:

1. A lamp comprising an upper frame member and a lower frame member spaced from each other and having a plurality of pegs thereon, and two pluralities of curved translucent lanceolate-shaped elements, the elements of one plurality of elements being shorter than and having a larger radius of curvature than the elements of the other plurality, said elements being connected between said upper and lower frame members with the ends thereof hooked to said pegs, the elements of one plurality alternating with the elements of the other plurality around the peripheries of the frame members with the edges of the elements with the smaller radius of curvature overlapping the edges of the elements with the larger radius of curvature in the peripheral direction and being spaced therefrom in the radial direction.

2. A lamp comprising an upper ring frame and a lower ring frame spaced from each other and having a plurality of pegs thereon, rod members on the lower ring frame extending toward said upper ring frame, a lamp holder on the ends of said rods, said upper ring frame being attached to said lamp holder, and two pluralities of curved translucent lanceolate-shaped elements, the elements of one plurality of elements being shorter than and having a larger radius of curvature than the elements of the other plurality, said elements being connected between said upper and lower frame members with the ends thereof hooked to said pegs, the elements of one plurality alternating with the elements of the other plurality around the peripheries of the frame members with the edges of the elements with the smaller radius of curvature overlapping the edges of the elements with the larger radius of curvature in the peripheral direction and being spaced therefrom in the radial direction.

3. A lamp as claimed in claim 2 in which said pegs are in pairs spaced around the periphery of said frames, the elements of said plurality of elements having the larger radius of curvature having holes in the ends thereof spaced from each other the same distance as the pegs in each pair, and the elements of said plurality of elements having the smaller radius of curvature having holes in the ends thereof spaced from each other a distance equal to the distance between the closest pegs of adjacent pairs of pegs.

References Cited in the file of this patent

UNITED STATES PATENTS

| | | |
|---|---|---|
| 798,444 | O'Neil | Aug. 29, 1905 |
| 1,684,416 | Schweitzer | Sept. 18, 1928 |
| 2,267,796 | Lezebrick | Dec. 30, 1941 |
| 2,758,198 | Kronhaus | Aug. 7, 1956 |
| 2,871,343 | Whitney | Jan. 27, 1959 |

FOREIGN PATENTS

| | | |
|---|---|---|
| 77,567 | Denmark | May 10, 1954 |